Dec. 22, 1964 L. L. RAKOCZI ETAL 3,162,816

GENERATOR OF DIFFERENT PATTERNS OF TIME-SEQUENTIAL PULSES

Filed Jan. 27, 1961 3 Sheets-Sheet 1

INVENTORS
LASZLO L. RAKOCZI &
BY LINO M. PAOLETTI
John V. Regan
Attorney

GENERATOR OF DIFFERENT PATTERNS OF TIME-SEQUENTIAL PULSES

Filed Jan. 27, 1961 3 Sheets-Sheet 2

INVENTORS
LASZLO L. RAKOCZI &
BY LINO M. PAOLETTI
John V. Regan
Attorney

Dec. 22, 1964 L. L. RAKOCZI ETAL 3,162,816

GENERATOR OF DIFFERENT PATTERNS OF TIME-SEQUENTIAL PULSES

Filed Jan. 27, 1961 3 Sheets-Sheet 3

INVENTORS
LASZLO L. RAKOCZI &
LINO M. PAOLETTI
BY John V. Regan
Attorney

United States Patent Office 3,162,816

Patented Dec. 22, 1964

3,162,816

GENERATOR OF DIFFERENT PATTERNS OF TIME-SEQUENTIAL PULSES

Laszlo L. Rakoczi, Merchantville, N.J., and Lino M. Paoletti, Philadelphia, Pa., assignors to Radio Corporation of America, a corporation of Delaware Filed Jan. 27, 1961, Ser. No. 85,265
6 Claims. (Cl. 328—63)

This invention relates to a new and improved circuit for generating pulses both of fixed and controllable duration. The invention is useful, among other places, in data processing equipment; and the circuit for generating pulses of controllable duration find special application in "asynchronous" digital computers. The invention is related to the apparatus described in Paoletti and Rakoczi, Patent No. 3,107,332, dated October 15, 1963, based on application Serial No. 31,335, filed May 24, 1960.

An objective of the invention is to provide a highly versatile control pulse generator which is suitable for use in data processing equipment.

Another objective of the invention is to provide a control pulse generator which is capable of asynchronous pulse generation, that is, which can produce pulses of a duration dependent upon the times required by various circuits in a digital computer to perform their functions.

The control pulse generator of the invention generates different groups of pulses in response to different patterns of control signals representative of binary digits applied to the generator. These control signals may be returns from the computer itself which indicate to the control pulse generator the desired pattern of control pulses to be produced as a consequence of the results of certain operations performed by the computer. As one example, the values of the control signals may be determined by the signs of two words being added. Under one set of circumstances, the generation of a group of control pulses is required which direct the computer to perform one form of binary addition and, under another set of circumstances, the generation of a group of control pulses is required which direct the computer to perform another form of binary addition.

The invention is described in greater detail below and is illustrated in the following drawing in which.

Throughout the figures, similar reference characters are applied to similar elements.

The individual blocks shown in the figures above are in themselves known circuits. The circuits of the blocks are actuated by electrical signals applied to the blocks. When the signal is at one level, it represents the binary digit "1" and when it is at another level, it represents the binary digit "0." For the sake of the discussion which follows, it is assumed that a high level signal represents the binary digit "1" and a low level signal the binary digit "0." Also, to simplify the discussion, rather than speaking of an electrical signal being applied to a block or logic stage, it is sometimes stated that a "1" or a "0" is applied to the block or stage.

Throughout the figures, a logic circuit known as a multiple-input "none" gate (sometimes also known as a "nor" gate) is used. A "none" gate produces a "1" output when all of the inputs of the gate are "0," and a "0" output when one or more of the inputs are "1." This gate may consist of an inverter connected to each of the input leads to an "and" gate. Alternatively, a "none" gate may consist of an "or" gate followed by an inverter. The Boolean equation for a "none" gate having A and B inputs and a C output is $\overline{AB}=C$ *or* $\overline{A+B}=C$, and the truth table for the gate is:

| A | B | C |
|---|---|---|
| 0 | 0 | 1 |
| 0 | 1 | 0 |
| 1 | 0 | 0 |
| 1 | 1 | 0 |

The flip-flops shown in the various figures are also conventional; however, the output connections are reversed from those usually shown. Thus, when a flip-flop is set, the barred or 0 output of the flip-flop becomes "1" and the unbarred or the 1 output of the flip-flop becomes "0." Conversely, when the flip-flop is reset, the unbarred or 1 output becomes "1" and the barred or 0 output becomes "0."

Figure 1:
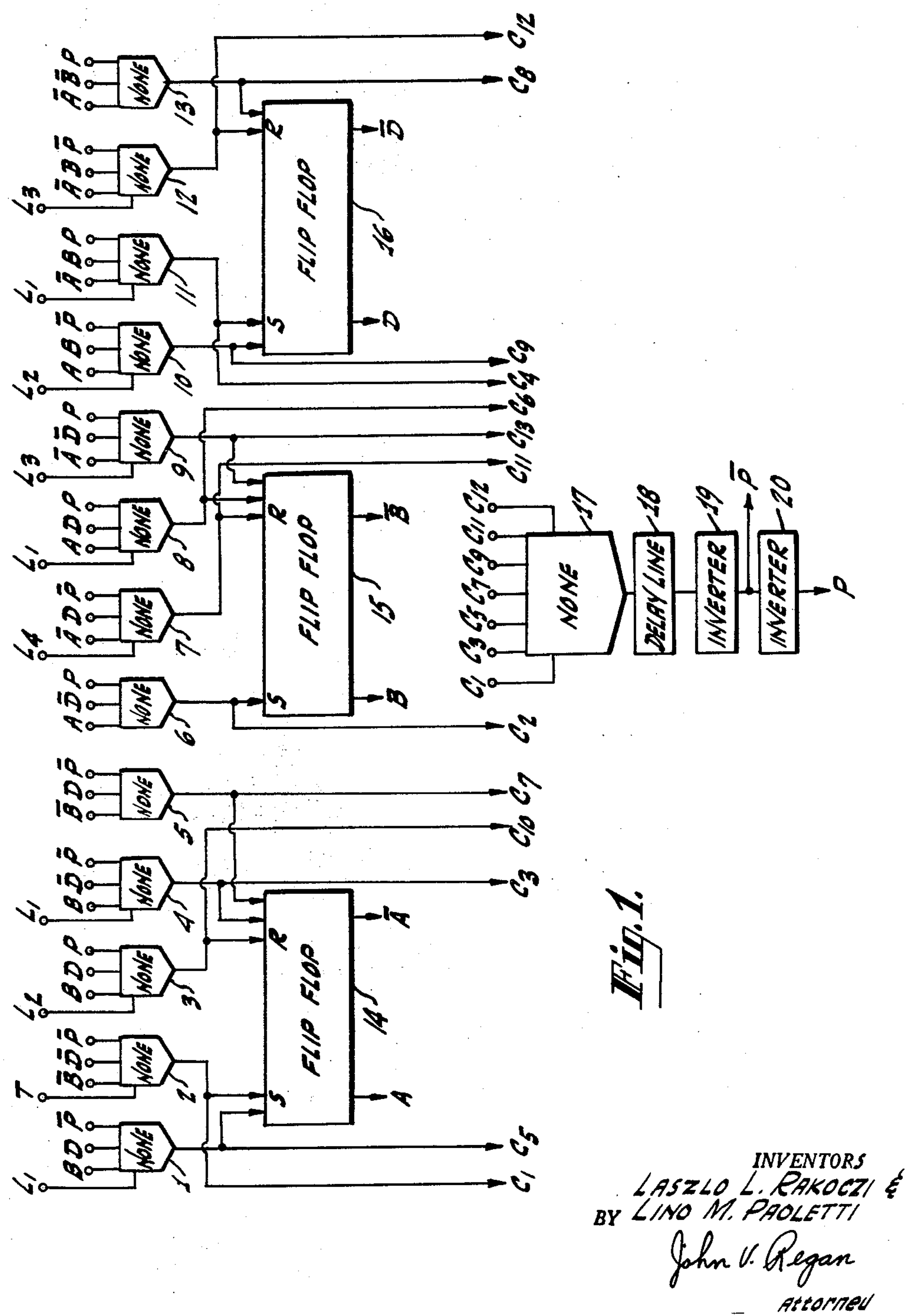
FIGURE 1 is a block circuit diagram of a synchronous control pulse generator according to the present invention.

The circuit shown in FIGURE 1 is capable of producing 13 different control pulses. These are produced by 13 "none" gates legended 1–13, respectively. The output terminals of the "none" gates are connected to set or reset connections of various flip-flops. Three such flip-flops 14, 15 and 16 are shown. The barred and unbarred output terminals of the flip-flops are connected in various different ways to the input terminals to the "none" gates, however, no "none" gate receives inputs from a flip-flop to which it supplies an output. For example, the flip-flop outputs to "none" gates 6–9 are $A\overline{D}$, $\overline{A}D$, $AD$ and $\overline{A}\overline{D}$, respectively. These "none" gates do not receive B or $\overline{B}$ inputs. Similarly, the flip-flop inputs to "none" gates 1, 2, 4 and 5 are $BD$, $\overline{B}\overline{D}$, $B\overline{D}$ and $\overline{B}D$. These "none" gates do not receive A or $\overline{A}$ inputs.

In addition to the above, various control signals are applied to the "none" gates. These are in the form of direct current levels. A control signal T, which may be manually applied or which may come from the control unit of the computer and is applied to "none" gate 2, starts the pulse generator operating. The control signals $L_1$–$L_4$ which may be manually introduced or which may come from the control unit of the computer, determine the pattern of control pulses which are produced, as is explained in more detail later.

Certain of the control pulses are applied as inputs to "none" gate 17. The output terminal of this "none" gate is connected through delay line 18 to series-connected inverters 19 and 20. The output of inverter 19 is a control signal $\overline{P}$ and the output of the inverter 20 is a control signal P. These signals are applied as inputs to the "none" gates in the manner shown in the figure. Each group of pulses applied to the "none" gates is unique.

From a logic standpoint, inverter 20 may be omitted and the P signal obtained from the lead between delay line 18 and inverter 19. However, this would mean that only part of the power available at the output of the delay line could be used to drive the "none" gates (since the other part of the power would be applied to the inverter 19). In a particular pulse generator for which the circuit of FIGURE 1 (and the circuit of FIGURE 4) is designed, a greater amount of pulse P power is desired and it is for this reason that the additional inverter stage 20 is employed to obtain P.

For the present, it may be assumed that the control signals $L_1$–$L_4$, each of which represents a binary digit, are manually applied. Such signals may each be derived from a voltage source, and a switch in series with the source. Later, circuits will be shown for producing signals $L_1$–$L_4$ in response to other signals.

In operation, control pulses $L_1$–$L_4$ may all initially represent the binary digit "1." Control signal T also initially represents the binary digit "1." The flip-flops 14, 15 and 16 are all initially reset so that the unbarred output of each of the flip-flops is "1" and the barred output is "0." Under these conditions, all of the "none" gates 1–13 have at least one "1" applied at an input terminal and accordingly all "none" gates are inactivated. Therefore, all of the C outputs of the "none" gate represent the binary digit "0." This means that no control pulses are present.

To start the pulse generator of FIGURE 1, T is changed from "1" to "0." It may also be assumed for the present that $L_1$ is changed from "1" to "0" and $L_2=L_3=L_4=1$. Under these conditions, "none" gate 2 is actuated since the four inputs to the "none" gate T, $\overline{B}$ $\overline{D}$ $\overline{P}$ are all "0." $\overline{P}$ is "0" because all of the inputs to "none" gate 17 are "0." This produces a "1" output at "none" gate 17 which is inverted in stage 19 to produce $\overline{P}$="0."

When "none" gate 2 is activated, control pulse $C_1$ is generated. This control pulse sets flip-flop 14, changing A to "0" and $\overline{A}$ to "1." Control pulse $C_1$ is also applied to "none" gate 17, changing the output of "none" gate 17 from "1" to "0." After a time equal to the delay induced by delay line 18, $\overline{P}$ changes from "0" to "1" and P changes from "1" to "0." The time delay may be of the order of one or more microseconds and is equal to the duration of each pulse C.

After the delay interval specified above, the inputs to "none" gate 6 are all "0." A is "0" by virtue of the setting of flip-flop 14 by control pulse $C_1$. $\overline{D}$ is 0 as flip-flop 16 is reset. P is "0" as the output of "none" gate 17 is "0." The activated "none" gate 6 produces control pulse $C_2$. This control pulse sets flip-flop 15, changing $\overline{B}$ to "1" and B to "0." $\overline{B}$ is one of the inputs to "none" gate 2, and when $\overline{B}$ changes to "1," "none" gate 2 is again inactivated. Accordingly, the start of control pulse $C_2$ signals the end of control pulse $C_1$.

$\overline{P}$ is also one of the inputs to "none" gate 2. $\overline{P}$ changes to 1 at the end of the delay line interval. Thus, this signal, $\overline{P}=1$, also insures that $C_1$ ends when $C_2$ starts and insures that the $C_1$ and $C_2$ pulses do not overlap.

Trigger signal $T$="0" may be terminated any time after the end of control pulse $C_1$. For example, it may change to $T$="1" at the end of pulse $C_2$ as shown in chart A below.

The analysis of the circuit above can be continued in the manner set forth, and if this is done, it is found that for the pattern of control signals $L_1$–$L_4$ given, a first group of pulses $C_1$–$C_8$ is generated. $L_1$ may be changed from "0" to "1" when control pulse $C_7$ is generated. This may be done manually or by a circuit discussed later. The purpose is to be ready to start the next cycle of pulse generation.

A second group of output pulses may be generated by the circuit of FIGURE 1 if a different pattern of control signals $L_1$–$L_4$ is applied. When the pattern is $L_1=1$, $L_2=0$, $L_3=1$, $L_4=1$, the control pulses produced are $C_1$, $C_2$, $C_9$, $C_{10}$, $C_{11}$ and $C_8$ in that sequence. In this group of pulses, when $C_{10}$ is generated, control pulse $L_4$ changes from "1" to "0." This can be done manually or by a circuit discussed later. During the generation of this group of pulses, $C_1$ and $C_2$ are produced in exactly the same way as discussed above. When pulse $C_2$ starts, the circuit conditions are $T=0$, $A=0$, $B=0$, $D=1$, $L_1=1$, $L_2=0$, $L_3=1$, $L_4=1$, $P=0$ and $\overline{P}=1$. After a time equal to the delay line interval, $\overline{P}$ changes to "0" and P changes to "1." Now the conditions are such as to activate "none" gate 10 and no other gate. This gate has as its inputs $L_2$, A, B and $\overline{P}$, all of which are 0. Accordingly, "none" gate 10 produces control pulse $C_9$. This control pulse sets flip-flop 16, changing $\overline{D}$ to 1. As $\overline{D}$ and P, both of which are now "1," are inputs to "none" gate 6 which produces control pulse $C_2$, "none" gate 6 is inactivated and pulse $C_2$ is terminated.

Control pulse $C_9$ is one of the inputs to "none" gate 17. Accordingly, after a delay equal to the delay imparted by delay line 18, $\overline{P}$ changes to "1" and P changes to "0." The conditions are now appropriate for generation of control pulse $C_{10}$ by "none" gate 3, as all of the inputs to "none" gate 3 are now "0." Control pulse $C_{10}$ resets flip-flop 14, changing A from "0" to "1." A and $\overline{P}$ are the inputs to "none" gate 10 which produces control pulse $C_9$. Accordingly, the start of control pulse $C_{10}$ signals the end of control pulse $C_9$.

The circuit operation for control pulse $C_{11}$ and $C_8$ of the second group is similar to that already discussed and can be easily followed. The operation is outlined in the charts which follow. To generate $C_{11}$, $L_4$ must be changed from "0" to "1" during the interval of pulse $C_{10}$. Again, this may be done manually or by the circuit discussed later. During the interval of $C_8$, $L_1$ is changed from "0" to "1."

A third pattern of control pulses can be produced from the circuit of FIGURE 1 by again changing the coding of the control signals $L_1$–$L_4$. When $L_1=1$, $L_2=0$, $L_3=1$ and $L_4=1$, the generator starts to generate pulses like those of the second group, namely $C_2$, $C_9$ and $C_{10}$. If, during the time $C_{10}$ is generated, $L_3$ is changed from "1" to "0" so that the pattern of L's is $L_1=1$, $L_2=0$, $L_3=0$ and $L_4=1$, the pulses $C_{12}$ and $C_{13}$ are generated. During the interval of $C_{12}$, $L_2$ changes from "0" to "1." The circuit operation can easily be traced in the manner outlined above.

The circuit operation discussed above for the three groups of pulses is given succinctly in Chart A below. In this chart, loop 1 corresponds to the first group of pulses $C_1$–$C_8$; loop 2 corresponds to the second group of pulses $C_1$, $C_2$, $C_9$, $C_{10}$, $C_{11}$, $C_8$; and loop 3 corresponds to the third group of pulses $C_1$, $C_2$, $C_9$, $C_{10}$, $C_{12}$, $C_{13}$.

CHART A

*Loop 1*

| T | A | $\overline{A}$ | B | $\overline{B}$ | D | $\overline{D}$ | $L_1$ | $L_2$ | $L_3$ | $L_4$ | P | $\overline{P}$ | PULSE |
|---|---|---|---|---|---|---|---|---|---|---|---|---|---|
| 1 | 1 | 0 | 1 | 0 | 1 | 0 | 1 | 1 | 1 | 1 | 1 | 0 | None |
| 0 | 0 | 1 | 1 | 0 | 1 | 0 | 0 | 1 | 1 | 1 | 1 | 0 | $C_1$ |
| 0 | 0 | 1 | 0 | 1 | 1 | 0 | 0 | 1 | 1 | 1 | 0 | 1 | $C_2$ |
| 1 | 1 | 0 | 0 | 1 | 1 | 0 | 0 | 1 | 1 | 1 | 1 | 0 | $C_3$ |
| 1 | 1 | 0 | 0 | 1 | 0 | 1 | 0 | 1 | 1 | 1 | 0 | 1 | $C_4$ |
| 1 | 0 | 1 | 0 | 1 | 0 | 1 | 0 | 1 | 1 | 1 | 1 | 0 | $C_5$ |
| 1 | 0 | 1 | 1 | 0 | 0 | 1 | 0 | 1 | 1 | 1 | 0 | 1 | $C_6$ |
| 1 | 1 | 0 | 1 | 0 | 0 | 1 | 1 | 1 | 1 | 1 | 1 | 0 | $C_7$ |
| 1 | 1 | 0 | 1 | 0 | 1 | 0 | 1 | 1 | 1 | 1 | 0 | 1 | $C_8$ |

*Loop 2*

| T | A | $\overline{A}$ | B | $\overline{B}$ | D | $\overline{D}$ | $L_1$ | $L_2$ | $L_3$ | $L_4$ | P | $\overline{P}$ | PULSE |
|---|---|---|---|---|---|---|---|---|---|---|---|---|---|
| 1 | 1 | 0 | 1 | 0 | 1 | 0 | 1 | 1 | 1 | 1 | 1 | 0 | None |
| 0 | 0 | 1 | 1 | 0 | 1 | 0 | 1 | 0 | 1 | 1 | 1 | 0 | $C_1$ |
| 1 | 0 | 1 | 0 | 1 | 1 | 0 | 1 | 0 | 1 | 1 | 0 | 1 | $C_2$ |
| 1 | 0 | 1 | 0 | 1 | 0 | 1 | 1 | 0 | 1 | 1 | 1 | 0 | $C_9$ |
| 1 | 1 | 0 | 0 | 1 | 0 | 1 | 1 | 0 | 1 | 0 | 0 | 1 | $C_{10}$ |
| 1 | 1 | 0 | 1 | 0 | 0 | 1 | 1 | 0 | 1 | 0 | 1 | 0 | $C_{11}$ |
| 1 | 1 | 0 | 1 | 0 | 1 | 0 | 1 | 1 | 1 | 1 | 0 | 1 | $C_8$ |
| 1 | 1 | 0 | 1 | 0 | 1 | 0 | 1 | 1 | 1 | 1 | 1 | 0 | None |

*Loop 3*

| T | A | $\bar{A}$ | B | $\bar{B}$ | D | $\bar{D}$ | $L_1$ | $L_2$ | $L_3$* | $L_4$ | P | $\bar{P}$ | PULSE |
|---|---|---|---|---|---|---|---|---|---|---|---|---|---|
| 0 | 0 | 1 | 1 | 0 | 1 | 0 | 1 | 0 | 1 | 1 | 1 | 0 | $C_1$ |
| 0 | 0 | 1 | 0 | 1 | 1 | 0 | 1 | 0 | 1 | 1 | 0 | 1 | $C_2$ |
| 1 | 0 | 1 | 0 | 1 | 0 | 1 | 1 | 0 | 1 | 1 | 1 | 0 | $C_9$ |
| 1 | 1 | 0 | 0 | 1 | 0 | 1 | 1 | 0 | 0 | 1 | 1 | 0 | $C_{10}$ |
| 1 | 1 | 0 | 0 | 1 | 1 | 0 | 1 | 1 | 0 | 1 | 1 | 0 | $C_{12}$ |
| 1 | 1 | 0 | 1 | 0 | 1 | 0 | 1 | 1 | 0 | 1 | 0 | 1 | $C_{13}$ |
| 1 | 1 | 0 | 1 | 0 | 1 | 0 | 1 | 1 | 0 | 1 | 1 | 0 | None |

*$L_3$ is reset by $C_1$.

The pattern of control signals L corresponding to the pulses in the various loops is given in Chart B below:

CHART B

| | $L_1$ | $L_2$ | $L_3$ | $L_4$ | PULSES | REMARKS |
|---|---|---|---|---|---|---|
| Loop 1 | 0 | 1 | 1 | 1 | $C$ -$C_7$ | $L_1$ changes from "0" to "1" during $C_7$. |
| | 1 | 1 | 1 | 1 | $C_8$ | |
| Loop 2 | 1 | 0 | 1 | 1 | $C_1$, $C_2$, $C_9$ | |
| | 1 | 0 | 1 | 0 | $C_{10}$, $C_{11}$ | $L_4$ changes from "1" to "0" during $C_{10}$. |
| | 1 | 1 | 1 | 1 | $C_8$ | $L_4$ changes from "0" to "1" and $L_2$ from "0" to "1" during $C_8$. |
| Loop 3 | 1 | 0 | 1 | 1 | $C_1$, $C_2$, $C_9$, | |
| | 1 | 0 | 0 | 1 | $C_{10}$ | $L_3$ changes from "1" to "0" during $C_{10}$. |
| | 1 | 1 | 0 | 1 | $C_{12}$, $C_{13}$ | $L_2$ changes from "0" to "1" during $C_{12}$. |

Figure 2:
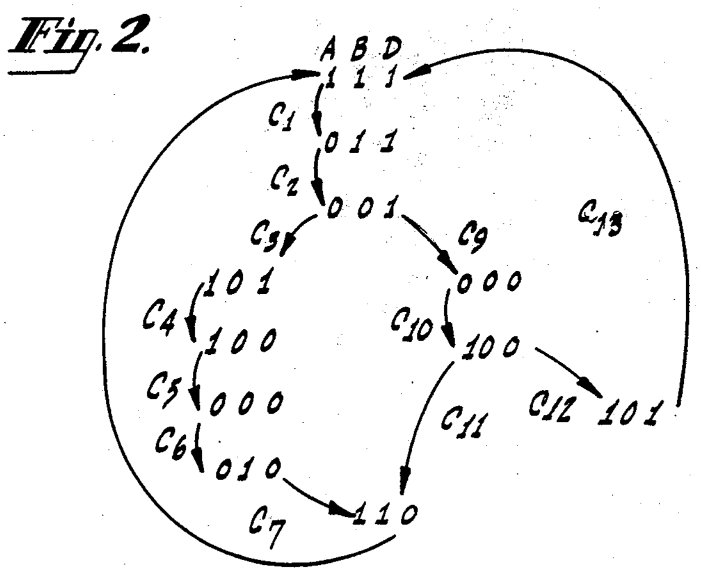
FIGURE 2 is a sketch showing various patterns of pulses which can be generated by the circuit of FIGURE 1.

The generation of the three different groups of pulses in the circuit of FIGURE 1 is shown diagrammatically in FIGURE 2. The binary digits given are the unbarred outputs A, B and D of the three flip-flops 14, 15 and 16, respectively. It is of interest to note that the binary numbers change only one binary digit at a time, just as in the Gray code, for example.

The circuit of FIGURE 1 is a synchronous control generator. In other words, each of the output pulses is of the same duration, and this duration is determined by the length of delay line 18.

Figure 3:
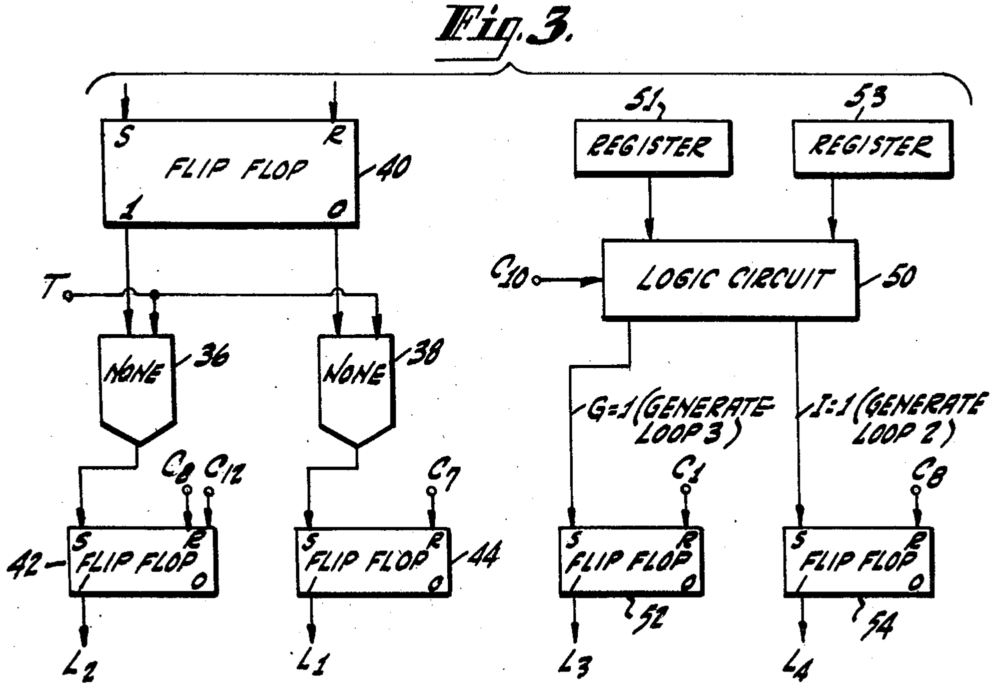
FIGURE 3 is a block circuit diagram of circuits which generate the control signals for the circuit of FIGURES 1 and 4.

FIGURE 3 shows, in brief form, the circuit for generating the control signals $L_1$–$L_4$. The circuit includes flip-flop 40 which may be, for example, one of the flip-flops in the instruction register of a large scale digital computer. The 1 output of the flip-flop is one input to "none" gate 36 and the 0 output is one input to "none" gate 38. These "none" gates also receive the T or trigger input which commands the pulse generator of FIGURE 1 to start producing pulses. The output of "none" gate 36 is applied to the set input terminal of a flip-flop 42 and the output of the "none" gate 38 is applied to the set input terminal of a flip-flop 34. These flip-flops produce the $L_2$ and $L_1$ control signals, respectively.

Block 50 at the upper right is a circuit for performing a logic operation on words transferred to it from registers such as 51 and 53. Each register has multiple output leads, however, they are represented in the drawing as a single bus for the sake of drawing simplicity. For example, block 50 may be an adder-subtracter and the operation it is to perform may depend upon whether the signs (plus or minus) of the words operated on are like or unlike. One output of the logic circuit 50 is connected to flip-flop 52 which produces the $L_3$ control signal and another output is connected to the flip-flop 54 which produces the $L_4$ control signal. Other outputs of the circuit 50 at which the output word is available are not shown.

The binary digit generated at the 1 output terminal of the flip-flop 40 determines whether the pulse generator is to generate the pulses in loop 1 or those of loops 2 or 3.

If the binary digit generated at the 1 terminal of flip-flop 40 is "1," the pulses in loop 1 are generated. If the binary digit generated at the 1 terminal of the flip-flop 40 is "0," then either the pulses in loop 2 or 3 are generated.

In operation, flip-flops 42, 44, 52 and 54 are all initially reset. Control pulses C generated in previous cycles perform the resetting. If the binary digit produced at the 1 output terminal of flip-flop 40 is "1" and the digit produced at the 0 terminal is "0," "none" gate 36 is disabled, and "none" gate 38 is enabled. If now T is made "0," instructing the pulse generator to start, "none" gate 38 produces a "1" output and flip-flop 44 is set. This means that $L_1$ becomes "0" and $L_2$ remains 1.

Figure 4:
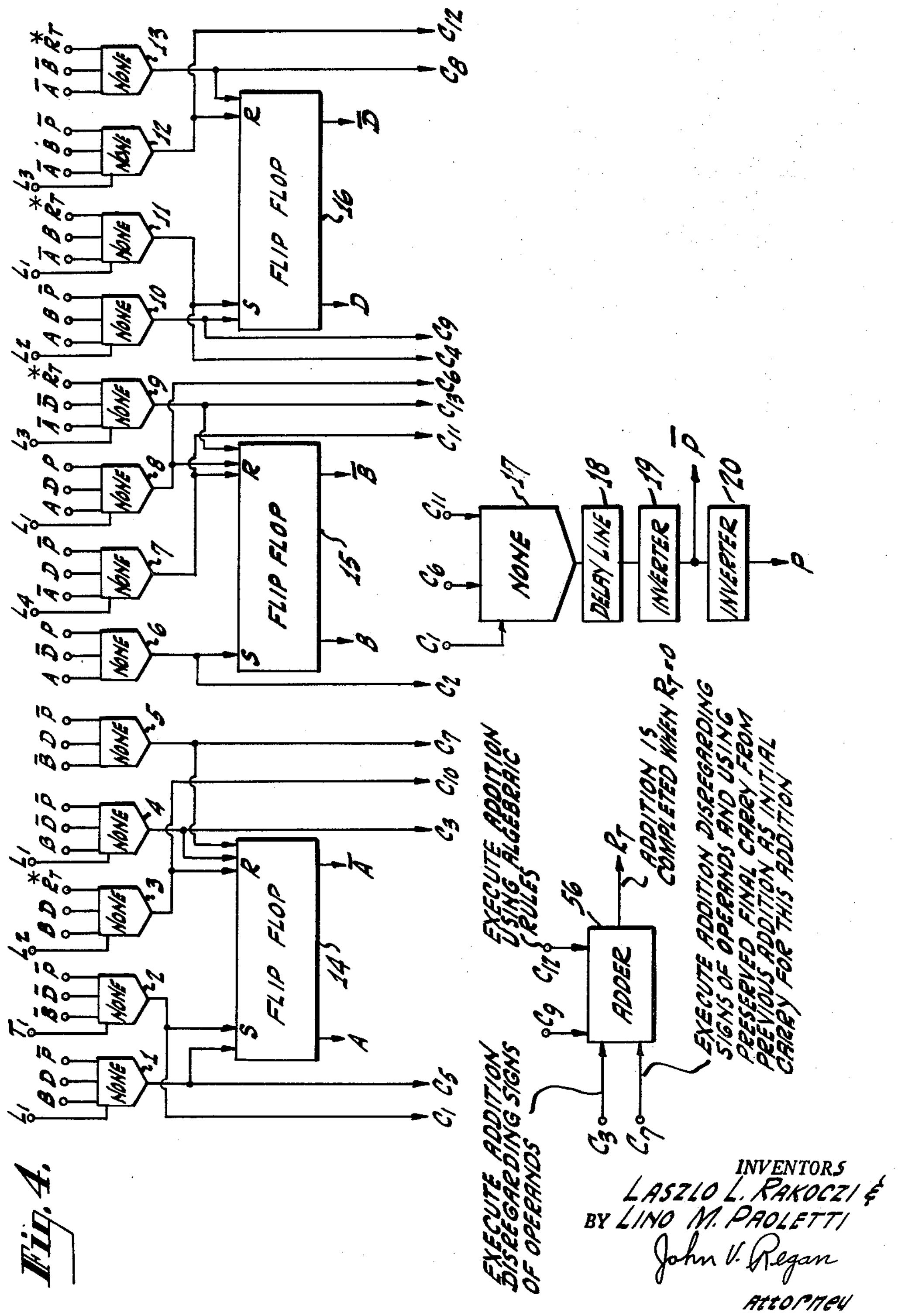
FIGURE 4 is a block circuit diagram of an asynchronous pulse generator according to the present invention.

Flip-flops 52 and 54 of FIGURE 4 are also initially reset. Therefore, $L_3$ and $L_4$ are "1." Thus, the values of $L_1$–$L_4$ are such that the generation of pulses in loop 1 begins. As can be seen from FIGURE 3, pulse $C_7$ is applied to the reset terminal of flip-flop 44. This changes $L_1$ to "1" as indicated in Chart A. Pulse $C_8$ is applied to the reset terminal of flip-flop 42. However, $L_2$ is already "1" so that pulse $C_8$ has no effect.

When the 1 output of flip-flop 40 (FIGURE 3) is a "0," gate 36 is enabled and gate 38 is disabled. The $T$="0" pulse now causes the "none" gate 36 to set flip-flop 42. The pattern of L pulses is now $L_1$="1," $L_2$="0," $L_3$="1," $L_4$="1." This is the pattern required for the generation of pulses in loop 2 and loop 3. Control pulses $C_1$, $C_2$, $C_9$ and $C_{10}$, in that order, are common to both loops.

The control pulse $C_{10}$ is applied to the logic circuit 50. Under one set of operating conditions, the circuit 50 produces an $I$="1" output which is applied to the set terminal of flip-flop 54. This changes $L_4$ from "1" to "0," whereby the generator produces pulses $C_{11}$ and $C_8$ after pulse $C_{10}$. These are the pulses of loop 2 as may be seen from charts A and B above. Pulse $C_8$ resets flip-flop 54 changing $L_4$ back to "1," and resets flip-flop 42, changing $L_2$ back to "1." Thus, all flip-flops 42, 44, 52 and 54 are reset and ready for the next cycle.

Under another set of operating conditions, when pulse $C_{10}$ is applied to logic circuit 50, $G$="1" is produced. This sets flip-flop 52 and $L_3$ changes from "1 to "0." Now the pulses $C_{12}$ and $C_{13}$ of loop 3 are generated. Pulse $C_{12}$ resets flip-flop 42, changing $L_2$ to "1." Pulse $C_1$ in the next cycle resets flip-flop 52.

The control pulse generator shown in FIGURE 4 is in many respects similar to the one of FIGURE 1. The principal difference is that the pulse generator of FIGURE 4 is a synchronous-asynchronous pulse generator. In other words, some of the pulses it produces are of fixed duration and others are of controllable duration. Put another way, the duration of some of the control pulses is controlled by the delay imparted by delay line 18, and the duration of other control pulses is determined by the length of time required to perform the operation commanded by the control pulse.

In the example chosen for illustration, the operation commanded is addition. Control pulses $C_3$, $C_7$, $C_9$ and $C_{12}$ are the ones which command addition. In each case, when the addition is completed, the adder, shown as block 56 at the lower left, produces an output pulse $R_T$. This output pulse in each case is applied to the gate which produces the following pulse. For example, $R_T$ is applied to "none" gate 11. Thus, when the addition is completed and $R_T$ changes from "1" to "0," "none" gate 11 is activated and control pulse $C_4$ starts. Control pulse $C_4$ sets flip-flop 16, changing $\bar{D}$ to "1." $\bar{D}$ is one of the inputs to "none" gate 4 which produces control pulse $C_3$. Accordingly, "none" gate 4 is inactivated and control pulse $C_3$ is terminated. In a similar manner, control pulses $C_7$, $C_9$ and $C_{12}$ are all of controllable duration.

What is claimed is:

1. In a pulse generator, a plurality of multiple input logic gates, each gate for producing an output pulse in response to a given pattern of input signals applied to said gate; a plurality of flip-flops, each with a set and reset input terminal and zero and one output terminals; a connection from the output of each gate to one of the set and reset input terminals of a flip-flop, and input connections to each gate from output terminals only of flip-flops other than the one to which its output is connected, each gate receiving not more than one input from each flip-flop; circuit means connected to receive the outputs of at least some of said gates for applying an enabling signal to other of said gates; and means for applying different patterns of a plurality of control signals to a group of said multiple input logic gates for producing different groups of time sequential output pulses from said generator.

2. In a pulse generator, a plurality of multiple input logic gates, each gate for producing an output pulse in response to a given pattern of input signals applied to said gate; a plurality of flip-flops, each with a set and reset input terminal and zero and one output terminals; a connection from the output of each gate to one of the set and reset input terminals of a flip-flop, and input connections to each gate from output terminals only of flip-flops other than the one to which its output is connected and not from flip-flops to which its output is connected, each gate receiving not more than one input from each flip-flop; circuit means connected to receive the outputs of at least some of said gates for applying enabling signals some of fixed and some of controllable duration to other of said gates; and means for applying different patterns of $n$ control signals to a group of said multiple input logic gates for producing different groups of output pulses in time sequence from said generator where $n$ is an integer greater than one.

3. In a pulse generator, a plurality of multiple input "none" gates, each gate for producing an output pulse in response to a given pattern of input signals applied to said gate; a plurality of flip-flops, each with a set and reset input terminal and zero and one output terminals; a connection from the output of each gate to one of the set and reset input terminals of a flip-flop, and input connections to each gate from output terminals only of flip-flops other than the one to which its output is connected, each gate receiving not more than one input from each flip-flop; circuit means connected to receive the outputs of at least some of said gates for applying enabling signals, some of fixed and some of controllable duration, to other of said gates; and means responsive to certain of the pulses produced by the gates for changing the values of the control signals applied to a group of said multiple input "none" gates for changing the pattern of output pulses produced in time sequence by said generator.

4. In a pulse generator, a plurality of logic gates, each having a plurality of input terminals and an output terminal, each gate for producing at its output terminal a different control pulse; a plurality of flip-flops, each receiving control pulses from different ones of said output terminals as set and reset voltages for said flip-flops; a circuit, including a delay line, to which a plurality of said control pulses are applied for producing delayed control pulses and inverted delayed control pulses; means for applying a group of control signals to some of said gates, not more than one control signal to a gate, for producing different patterns of output pulses from the gates; means for applying said delayed control pulses and said inverted delayed control pulses to said gates, not more than one to a gate; and means for applying to each gate the outputs of flip-flops other than the one to which the gate output terminal is connected, each gate receiving not more than one input from each flip-flop.

5. In a pulse generator, a plurality of "none" gates, each having a plurality of input terminals and an output terminal, each gate for producing at its output terminal a different control pulse; a plurality of flip-flops, each receiving control pulses from different ones of said output terminals as set and reset voltages for said flip-flops; a circuit, including a delay line, to which a plurality of said control pulses are applied for producing uninverted delayed control pulses and inverted delayed control pulses; means for applying said uninverted delayed control pulses and said inverted delayed control pulses to said gates, not more than one delayed control pulse to a gate; means for applying to each "none" gate the output of flip-flops other than the one to which the gate output terminal is connected, each "none" gate receiving different combinations of said flip-flop outputs and delayed control pulses; and means for applying a group of control signals, not more than one signal to a gate, to a group of said "none" gates, for controlling the pattern of control pulses produced by the "none" gates.

6. In a pulse generator, a plurality of logic gates, each having a plurality of input terminals and an output terminal, each gate for producing at its output terminal a different control pulse; a plurality of flip-flops, each receiving control pulses from different ones of said output terminals as set and reset voltages for said flip-flops; a first circuit, including a delay line, to which a plurality of said control pulses are applied for producing uninverted delayed control pulses and inverted delayed control pulses; an asynchronous circuit to which at least one of the control pulses not applied to said first circuit is applied, for producing a control signal which is delayed a variable amount of time; means for applying said uninverted delayed control pulses and said inverted delayed control pulses to said gates, not more than one to a gate; means for applying said variably delayed control signal to at least one of said gates; means for applying to each gate the outputs of flip-flops other than the one to which the gate output terminal is connected, each gate receiving different combinations of said flip-flop outputs and delayed control pulses; and means for applying a group of control signals, not more than one signal to a gate, to a group of said logic gates, for controlling the pattern of control pulses produced by said logic gates.

References Cited by the Examiner

UNITED STATES PATENTS 3,107,332 10/63 Paoletti et al. ---------- 328—63

OTHER REFERENCES

Handbook of Automation, Computation and Control, vol. II, by Grabbe, Ramo and Woolridge, John Wiley & Sons, Oct. 12, 1959, pages 17–01 to 17–32.

ARTHUR GAUSS, *Primary Examiner.*

IRVING L. SRAGOW, *Examiner.*